(12) United States Patent
Landry et al.

(10) Patent No.: US 9,181,450 B2
(45) Date of Patent: Nov. 10, 2015

(54) COATINGS CONTAINING NANOCRYSTALLINE CELLULOSE, PROCESSES FOR PREPARATION AND USE THEREOF

(75) Inventors: Véronic Landry, Quebec (CA); Pierre Blanchet, Quebec (CA)

(73) Assignee: FPINNOVATIONS, Pointe-Claire, QC (CA)

( * ) Notice: Subject to any disclaimer, the term of this patent is extended or adjusted under 35 U.S.C. 154(b) by 691 days.

(21) Appl. No.: 13/517,282

(22) PCT Filed: Dec. 20, 2010

(86) PCT No.: PCT/CA2010/002034
§ 371 (c)(1),
(2), (4) Date: Nov. 27, 2012

(87) PCT Pub. No.: WO2011/075837
PCT Pub. Date: Jun. 30, 2011

(65) Prior Publication Data
US 2013/0061774 A1 Mar. 14, 2013

Related U.S. Application Data

(60) Provisional application No. 61/288,523, filed on Dec. 21, 2009.

(51) Int. Cl.
*C09D 101/02* (2006.01)
*C09D 151/02* (2006.01)
*C08F 251/02* (2006.01)
*C09D 143/04* (2006.01)

(52) U.S. Cl.
CPC ............ *C09D 151/02* (2013.01); *C08F 251/02* (2013.01); *C09D 143/04* (2013.01)

(58) Field of Classification Search
None
See application file for complete search history.

(56) References Cited

U.S. PATENT DOCUMENTS 3,157,518 A * 11/1964 Battista .................... 426/125
6,555,612 B1 * 4/2003 Mayer et al. ............. 524/501
7,198,824 B1 * 4/2007 Schwarte et al. ......... 427/407.1
8,420,175 B2 4/2013 Hayashi et al.

FOREIGN PATENT DOCUMENTS

WO 9521901 8/1995
WO 2009151018 A1 12/2009

OTHER PUBLICATIONS

Abdelmouleh et al, modification of cellulosic fibres with functionalised silanes: developement of surface properties, 2004, international journal of adhesion, 24, pp. 43-54.*
U.S. Pat. No. 8,420,175 is equivalent to WO 2009/151018 A1.
International Search Report of PCT/CA2010/002034.

(Continued)

*Primary Examiner* — Melvin C Mayes
*Assistant Examiner* — Stefanie Cohen
(74) *Attorney, Agent, or Firm* — Norton Rose Fulbright Canada LLP

(57) ABSTRACT

This invention relates to coatings for wood and improvement in the surface properties of cured coatings of the invention. The invention further relates to a method for improving at least one property such as mechanical, optical or a combination thereof and to a process for preparing a nanocrystalline cellulose-containing hydrodispersible, hydrosoluble and hydrophobic wood coating.

10 Claims, 4 Drawing Sheets

(56) References Cited

OTHER PUBLICATIONS

Ruiz, M. M. et al. "New Waterborne Epoxy Coatings Based on Cellulose Nanofillers" Macromol. Symp. 2001, vol. 169, p. 211-222.
Pu, Y. et al. "Investigation into nanocellulosics versus acacia reinforced acrylic films" Composites: Part B, 2007, vol. 38, p. 360-366.
Samir, M. A. S. S. et al. "Preparation of Cellulose Whiskers Reinforced Nanocomposites from an Organic Medium Suspension" Macromolecules, 2004, vol. 37, p. 1386-1393.
Cao, X. et al. "New Nanocomposite Materials Reinforced with Flax Cellulose Nanocrystals in Waterborne polyurethane" Biomacromolecules, 2007, vol. 8, p. 899-904.
Chazeau, L. "Mechanical Behaviour Above Tg of Plasticised PVC with Cellulose Whiskers; a SANS Structural Study" Polymer, 1999, vol. 40, 5333-5344.
Gousse, C. et al. "Stable Suspensions of Partially Silyated Cellulose Whiskers Dispersed in Organic Solvents" Polymer, 2002, vol. 43, p. 2645-2651.
Hamad, W. "On the Development and Applications of Cellulosic Nanofibrillar and Nanocrystalline Materials" The Canadian Journal of Chemical Engineering, 2006, vol. 84, p. 513-519.
Hubbe, M. A. et al. "Cellulosic Nanocomposites: A Review" BioResources, 2008, vol. 3, p. 929-980.
Sain, M. "An Overview of Cellulose Nanotechnology—Research and Applications" Cellulose Nanocomposite Symposium, Madison, Wisconsin, May 13, 2009, No. 221.

\* cited by examiner

COATINGS CONTAINING NANOCRYSTALLINE CELLULOSE, PROCESSES FOR PREPARATION AND USE THEREOF

CROSS-REFERENCE TO RELATED APPLICATIONS

This application is a National entry of PCT/CA2010/002034 filed Dec. 20, 2010, in which the United States of America was designated and elected, and which remains pending in the International phase until Jun. 21, 2012, which application in turn claims priority under 35 USC 119(e) from U.S. Provisional Application Ser. No. 61/288,523, filed Dec. 21, 2009.

FIELD OF THE INVENTION

This invention relates to coatings for wood and improvement in the surface properties of cured coatings.

BACKGROUND OF THE INVENTION

Inorganic reinforcing agents are added to coatings with the aim of improving various properties including mechanical properties such as abrasion, scratch and impact resistance as well as adhesion. Optical properties, such as gloss, can also be modified by the addition of certain inorganic materials. The main materials used in order to modify the properties of coatings are silica (fumed or crystalline), aluminum oxide, calcium carbonate and titanium dioxide. Some of these materials are not easily dispersible in aqueous mediums and they have a certain level of toxicity.

SUMMARY OF THE INVENTION

In one aspect, there is provided a composition for coating wooden elements comprising a wood coating and dispersible nanocrystalline cellulose or nanocrystalline cellulose modified with an organofunctional silane.

In a further aspect, there is provided a method for improving at least one of i) the property of a dried wood coating on a wooden element wherein said property is mechanical, optical or a combination thereof; and ii) polymerization or curing rate of a wood coating on a wooden element; or a combination of i) and ii) thereof, said method comprising adding dispersible nanocrystalline cellulose or nanocrystalline cellulose modified with an organofunctional silane to a wood coating.

In a further aspect, there is provided a process for preparing a nanocrystalline cellulose-containing water-based wood coating comprising:
  a) preparing a concentrated aqueous suspension of D-NCC by concentrating a low concentration aqueous suspension of said D-NCC or by dispersing said D-NCC in a small volume of an aqueous medium; and
  b) mixing the concentrated aqueous suspension of D-NCC and a hydrosoluble coating, at high speed for a period of time suitable to disperse said D-NCC in said hydrosoluble coating;
    mixing the concentrated aqueous suspension of D-NCC and a hydrodispersible coating, that is an emulsion, at low speed for a period of time suitable to disperse said D-NCC is said hydrosoluble coating; or
    mixing the concentrated aqueous suspension of D-NCC and a first portion of a hydrodispersible coating, that is an emulsion, at high speed for a period of time suitable to disperse said D-NCC is said first portion of the hydrodispersible coating, and mixing said dispersed D-NCC-containing hydrodispersible coating to a second portion of said hydrodispersible coating at low speed for a period of time suitable to obtain uniformly dispersed D-NCC in the combined said first and second portions of said hydrodispersible coating and wherein the first portion is of said hydrodispersible coating is smaller than the second portion of said hydrodispersible coating.

In one aspect, there is provided a process for preparing a nanocrystalline cellulose-containing hydrophobic wood coating comprising mixing NCC modified with an organofunctional silane to (a) monomers or (b) a mixture of monomers and oligomers for a period of time suitable to disperse said NCC in said hydrophobic coating.

In one aspect, there is provided a method for coating a wooden element comprising applying a coating comprising dispersible nanocrystalline cellulose or nanocrystalline cellulose modified with an organofunctional silane to said wooden element.

In one aspect, there is provided a coated wooden element comprising at least one layer of nanocrystalline cellulose-containing wood coating applied on at least one side of said wooden element, wherein said nanocrystalline cellulose is dispersible nanocrystalline cellulose or nanocrystalline cellulose modified with an organofunctional silane.

DESCRIPTION OF THE DRAWINGS

Embodiments of the invention can be described with reference to the following drawings, wherein.

DETAILED DESCRIPTION OF EMBODIMENTS IN ACCORDANCE WITH THE INVENTION

Figure 1:
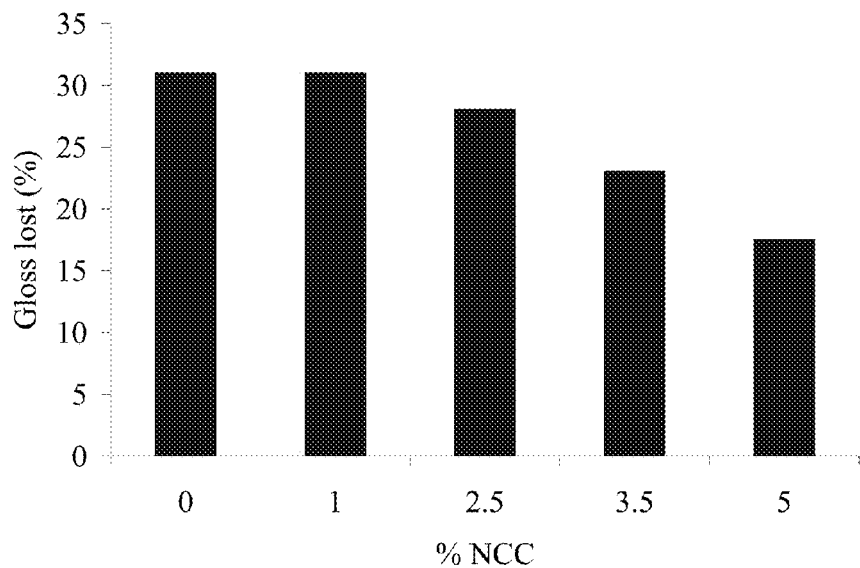
FIG. 1 is a graph illustrating the gloss lost in function of the percentage of D-NCC.

The addition of reinforcing agents is sometimes desirable in order to improve properties of the resins used in wood coatings. The coating industry is using a large and diverse quantity of such mechanical reinforcing agents and other additives.

NCC is a renewable material, which can be recycled, is carbon neutral and essentially non-toxic. NCC is a material which can be produced and used on a commercial scale. The addition of nanocrystalline cellulose (NCC) in different coatings has led to the improvement of one or more properties of wood coatings.

In one embodiment, there is provided a composition for coating wooden elements comprising a wood coating and nanocrystalline cellulose wherein said nanocrystalline cellulose is dispersible nanocrystalline cellulose or nanocrystalline cellulose modified with an organofunctional silane.

In one embodiment, the nanocrystalline cellulose is from wood.

In one embodiment, the amount of nanocrystalline cellulose, whether it is dispersible (D-NCC) or derivatized (such as a silane derivative NCC like MEMO-g-NCC) is up to about 5% by weight of the wood coating or from about 1% to about 5% by weight of the wood coating, preferably about 1% or about 2%. In one embodiment, the amount of nanocrystalline cellulose is from about 1% to about 4% by weight. In one embodiment, the amount of nanocrystalline cellulose is from about 1% to about 3% by weight. In one embodiment, the amount of nanocrystalline cellulose is from about 2% to about 4% by weight. In one embodiment, the amount of nanocrystalline cellulose is from about 2% to about 3% by weight.

In one embodiment, the composition further comprises at least one reinforcing agent and/or other additive suitable for wood coatings.

In one embodiment, the at least one reinforcing agent and/or other additive is silica (fumed or crystalline), aluminum oxide, calcium carbonate, titanium dioxide or mixtures thereof.

In further embodiments:
the at least one reinforcing agent and/or other additive is silica (fumed or crystalline;
the at least one reinforcing agent and/or other additive is aluminum oxide;
the at least one reinforcing agent and/or other additive is calcium carbonate; or
the at least one reinforcing agent and/or other additive is titanium dioxide.

In one embodiment, the at least one reinforcing agent and/or other additive is present in a cumulative amount of up to about 10 w/w %.

In one embodiment, the at least one reinforcing agent and/or other additive is present in a cumulative amount of up to about 5 w/w %.

In one embodiment, the at least one reinforcing agent and/or other additive is present in a cumulative amount of about 1 to 5 w/w %.

In one embodiment, the at least one reinforcing agent and/or other additive is present in a cumulative amount of about 1 to 3 w/w %.

In one embodiment, the at least one reinforcing agent and/or other additive is present in a cumulative amount of about 3 to 5 w/w %.

It has been observed that the addition of a small amount of nanocrystalline cellulose improved one or more mechanical properties of the coatings.

Scratch resistance, abrasion resistance, hardness, impact resistance or a combination thereof are improved by the addition of nanocrystalline cellulose. The gloss was decreased by the addition of NCC which appears to act as a matting agent. Moreover, the addition of nanocrystalline cellulose improves the reaction rate of the polymerization as well as the degree of polymerization of UV-cured coatings.

In one embodiment, the coating is a hydrosoluble water-based coating (such as water-based UV-cured varnish), a hydrodispersible lacquer (such as acrylic emulsions) or hydrophobic UV-cured high solids varnish. Water-based coatings include acrylics, acrylates, urethanes-acrylics, polyurethanes (1K and 2K) and UV-polyurethanes.

In one embodiment, the coating is a hydrosoluble water-based coating.

In one embodiment, the coating is a hydrodispersible lacquer.

In one embodiment, the coating is a hydrophobic UV-cured high solids varnish.

In one embodiment, the coating containing nanocrystalline cellulose is applied by spray, roller coater or brush depending on the coating viscosity.

Moreover, the use of D-NCC makes it possible to control the gloss of the coatings and allows for a better retention of gloss which is susceptible of improving the burnish resistance.

Dispersible nanocrystalline cellulose (D-NCC) and various grades of more hydrophobic NCC which were developed to give good dispersion in hydrophilic and hydrophobic mediums, were used in this work. As referred herein, D-NCC means a dispersible or re-dispersible nanocrystalline cellulose such as that described in U.S. Provisional Application 61/193,620 filed Dec. 11, 2008 as well as PCT/CA2009/001787 which are incorporated herein by reference. Nanocrystalline cellulose produced from kraft fibres and other cellulose sources contains $H^+$ counterions associated with the surface sulfate ester groups imparted to the NCC during sulfuric acid hydrolysis. This can be referred to as acid-form NCC (H-NCC) Typically, dispersible nanocrystalline cellulose can be produced, for example, by counterion exchange with monovalent cations. The production involves preparing monovalent cation (such as sodium)-form NCC suspensions by (1): titrating acid-form (H-NCC) NCC suspensions with an alkali-metal base (such as sodium hydroxide) to neutral or near-neutral pH, or (2): placing H-NCC suspensions on monovalent cation exchange resin to neutral or near-neutral pH. The resulting NCC from techniques (1) or (2) are dried using techniques such as air drying or freeze-drying. The counterion exchange by "titration" can be carried using monovalent cation hydroxides MOH (such as NaOH, KOH, CsOH, $NH_4OH$, and $R_4NOH$ or tri-, di- or mono-alkylamine ($HR_3N$—, $H_2R_2N$— and $H_3RN$—) hydroxides). The dispersible NCC is redispersible in water to give a well-dispersed suspension with brief sonication. General Procedures A, B and C below provide general examples for producing Na-dispersible NCC and dispersing same in water. Detailed protocols are provided is U.S. 61/193,620 as well as PCT/CA2009/001787 as mentioned above.

These materials were added to various water-based coatings (acrylic lacquer and a water-based UV-cured varnish) and to a UV-cured high solids varnish.

In one embodiment, D-NCC is a sodium dispersible NCC.

In one embodiment, D-NCC is a potassium dispersible NCC.

In one embodiment, D-NCC is a cesium dispersible NCC.

In one embodiment, D-NCC is an ammonium dispersible NCC.

In one embodiment, D-NCC is a freeze-dried D-NCC.

In one embodiment, D-NCC is an air-dried D-NCC.

In one embodiment, D-NCC is a freeze-dried sodium dispersible NCC.

In one embodiment, D-NCC is a freeze-dried potassium dispersible NCC.

In one embodiment, D-NCC is a freeze-dried cesium dispersible NCC.

In one embodiment, D-NCC is a freeze-dried ammonium dispersible NCC.

In one embodiment, D-NCC is an air-dried sodium dispersible NCC.

In one embodiment, D-NCC is an air-dried potassium dispersible NCC.

In one embodiment, D-NCC is an air-dried cesium dispersible NCC.

In one embodiment, D-NCC is an air-dried ammonium dispersible NCC

NCC was added in concentrations of up to about 5% by weight of the dry coating film. This means that for coatings prepared from a non-reactive thinner, such as water, the concentration of NCC in the liquid medium was much lower. After evaporation of the water, the NCC concentration was up to 5% by weight in the dry film.

In one embodiment, there is provided processes for preparing a composition for coating wooden elements comprising mixing a wood coating and nanocrystalline cellulose as described herein.

The applicant has successfully developed processes to incorporate NCC into coatings and to achieve good dispersion. Three approaches were developed to disperse NCC into hydrosoluble water-based products (water-based UV-cured varnish), hydrodispersible lacquers (acrylic emulsions) and UV-cured high solids varnish. The latter is highly hydrophobic which means that they are non-miscible with water suspensions of D-NCC. In this case, NCC(H-NCC or D-NCC) was modified in order to obtain a more hyprophobic NCC. NCC was modified with an organofunctional silane. These products are called coupling agents as their role is to bond the inorganic filler (i.e. NCC) with the resin (i.e. acrylate). Those can be a (meth)acryloxyalkyl-trialkoxysilane such as 3-methacryloxypropyltrimethoxysilane (Dynasylan MEMO from Evonik), an amino-alkyl functional water-borne oligosiloxane (such as Hydrosil 2902) and an epoxyfunctional oligosiloxane (such as Hydrosil 2906). These organofunctional silane (or coupling agents) are commercially available or well known in the art. The organic functions, especially those of the 3-methacryloxypropyltrimethoxysilane, can react with the acrylate functions of the UV high solids coatings, improving significantly the compatibility compare with non-treated NCC. H-NCC and D-NCC were both used as the starting material. H-NCC led to better results. The ratio NCC and silane used varies from 2:1 to 50:1. Following the addition of the silane, acetic acid was added to the NCC dispersion in order to hydrolyze the silane. Acetic acid was added at 0.05% by weight of the NCC. After the addition of the acetic acid, the mixture was heated up to 50° C. from 1 to 2 hours.

In one embodiment, the (meth)acryloxyalkyl-trialkoxysilane is (meth)acryloxy-C2-6alkyl-tri-C1-3alkoxysilane.

In one embodiment, the (meth)acryloxyalkyl-trialkoxysilane is (meth)acryloxy-C2-4-alkyl-tri-C1-2alkoxysilane.

In one embodiment, the (meth)acryloxyalkyl-trialkoxysilane is (meth)acryloxy-C2-3alkyl-tri-C1-2alkoxysilane.

In one embodiment, the (meth)acryloxyalkyl-trialkoxysilane is 3-methacryloxypropyl-trialkoxysilane.

In one embodiment of the process for preparing a nanocrystalline cellulose-containing water-based wood coating, step b) is mixing the concentrated aqueous suspension of D-NCC and a hydrosoluble coating, at high speed for a period of time suitable to disperse said D-NCC in said hydrosoluble coating.

In one embodiment of the process for preparing a nanocrystalline cellulose-containing water-based wood coating, step b) is mixing the concentrated aqueous suspension of D-NCC and a hydrodispersible coating, that is an emulsion, at low speed for a period of time suitable to disperse said D-NCC is said hydrosoluble coating.

In one embodiment of the process for preparing a nanocrystalline cellulose-containing water-based wood coating, step b) is mixing the concentrated aqueous suspension of D-NCC and a first portion of a hydrodispersible coating, that is an emulsion, at high speed for a period of time suitable to disperse said D-NCC is said first portion of the hydrodispersible coating, and mixing said dispersed D-NCC-containing hydrodispersible coating to a second portion of said hydrodispersible coating at low speed for a period of time suitable to obtain uniformly dispersed D-NCC in the combined said first and second portions of said hydrodispersible coating and wherein the first portion is of said hydrodispersible coating is smaller than the second portion of said hydrodispersible coating.

In one embodiment, there is provided a process for preparing a nanocrystalline cellulose-containing hydrophobic wood coating comprising mixing a powder of substantially anhydrous MEMO-derived NCC to (a) monomers or (b) a mixture of monomers and oligomers for preparing said coating for a period of time suitable to disperse said NCC is said hydrophobic coating.

As used herein, "low speed", with reference to agitation of NCC-added coatings, means a shear that will not negatively affect the coatings such as destabilizing an emulsion. Generally, a low speed is from about 100 to 500 rpm.

As used herein, "high speed", with reference to agitation of NCC-added coatings, means a shear that will be efficient for effecting the dispersion. The speed is not especially limited but generally refers to a speed of from about 2000 to 5000 rpm.

Preparation 1

Hydrosoluble Coatings

The first approach used for hydrosoluble water-based coatings, in this case a UV-curable polyurethane (Aquarad 30 from Akzo Nobel), comprises the addition of a concentrated aqueous suspension of NCC (10% by weight) to the hydrosoluble coatings and mixing under strong agitation for 15 to 45 minutes using a high speed mixer (2000 rpm). This approach should not be applied to hydrodispersible lacquers as high speed mixing can easily destabilize the emulsion.

The two following preparation methods are more suitable for hydrodispersible coatings or high concentration water-soluble resins when a relatively large quantity of water can be added.

Preparation 2

Hydrodispersible Coatings Method A

The hydrodispersible lacquers (e.g. acrylic emulsions such as 162-095 clear Aqua-syl 90° from Peintures Canlak inc.) are obtained from the coating supplier at a solids content of approximately about 40% by weight. These products are then diluted with water to obtain a solid content of approximately about 30% by weight (between 25 and 35%), which facilitates the application by spray. By adding a concentrated aqueous suspension of D-NCC (from 7 to 10% by weight) to the resin which is at about 40% by weight (between 38 and 42%) and agitating the mixture for at least 30 minutes (maximum one hour) at a speed between 100 and 500 rpm with an high speed mixer from Ragogna Custom Machinery inc., The aqueous suspension of D-NCC can be prepared by concentrating a low concentration aqueous suspension according to methods known in the art or by dispersing the D-NCC in cold or hot water.

Preparation 3

Hydrodispersible Coatings Method B

An alternative preparation method to disperse the D-NCC in acrylic emulsions such as Aqua-syl 90° (see Preparation 2) is to add a high concentration of NCC in the acrylic lacquer and then strongly agitate this mixture with either a high speed mixer (from 2000 to 5000 rpm, laboratory mixer from Ragogna Custom Machinery) or an ultrasonic probe (to achieve optimal dispersion of the D-NCC. A small quantity of this mixture is then added to the hydrodispersible lacquers while agitating gently (between 100 and 500 rpm). It is believed that when a small portion only of the final acrylic lacquer (between 1/5 to 1/10) is negatively affected by strong shear used for dispersion of the D-NCC, the final coating should perform well.

Preparation 4

Hydrophobic Coatings

Two further preparation methods were developed to disperse NCC in hydrophobic coatings such as UV-cured high solids varnishes. UV high solid formulation was prepared from two acrylate monomers and oligomers. In this case, it is necessary to work with dry NCC having a moisture content of less than about 5% by weight to ensure a good dispersion. Dry NCC is ground using a jar mill to produce a fine powder. Then, this powder can be (a) mixed with the monomers only and dispersed using one of several different types of equipment: a bead mill, a homogeniser, a ball mill, an ultrasonic probe or a three roll mill used for a period of 10 to 30 minutes depending on the technique used or (b) added to the complete mixture of acrylates (monomers and oligomers) and dispersed using a high speed mixer, a three roll mill or a bead mill. In order to ensure the dispersibility of the NCC in this medium, the grafting of non-polar organic functions which are compatible with the hydrophobic coatings, is valuable. In this case, 3-methacryloxypropyltrimethoxysilane was used at the grafting agent.

General Procedure A: Counterion Exchange with $Na^+$ by Addition of Aqueous NaOH to Acid-Form NCC Suspension Followed by Freeze-Drying A known amount of acid-form NCC (1-10% (w/w)) at room temperature is placed in a beaker with a magnetic stir bar. Aqueous sodium hydroxide (0.02-2 N, preferably 0.02-0.2 N) is added slowly with stirring until the pH reaches 5-7. The suspension is diluted if necessary to 0.01-5% NCC (w/w), frozen at −65° C. to −80° C. and freeze-dried under a vacuum of 50-100 mTorr. After freeze-drying, a product with a texture ranging from flaky lamellar to a solid foam to a soft powder was obtained.

Figure 2:
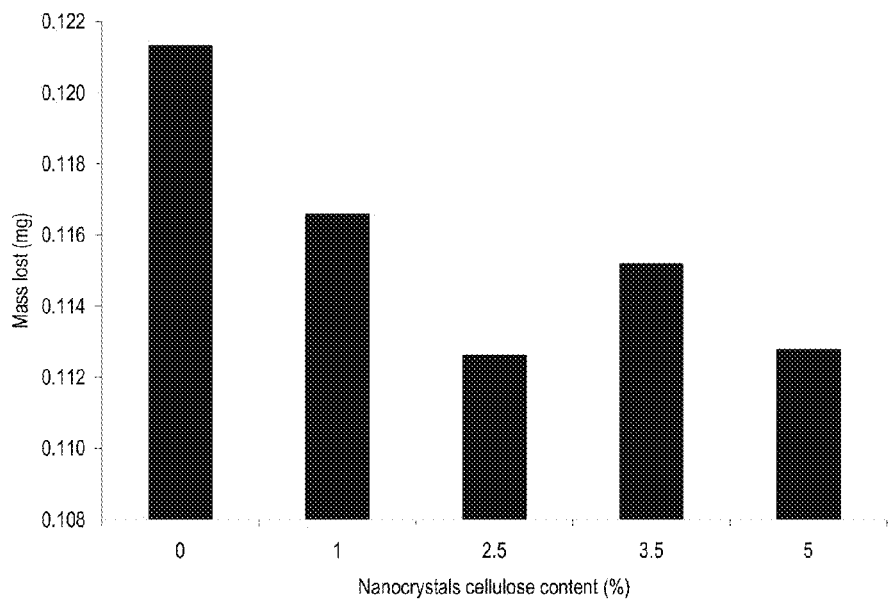
FIG. 2 illustrates the mass lost of the UV-cured water-based varnish with D-NCC loading from about 1% to 5%.
Figure 3:
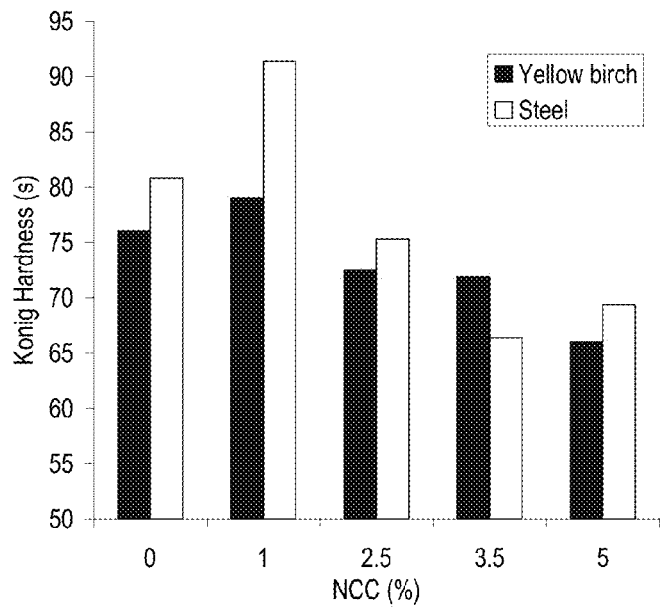
FIG. 3: illustrates the hardness of the acrylic lacquer in function of the D-NCC loading.

General Procedure B: Counterion Exchange with $Na^+$ by Placing Acid-Form NCC Suspension Over Sodium-Form Cation Exchange Resin Followed by Freeze-Drying Sodium-form cation exchange resin is added to acid-form NCC suspension (1-5% NCC (w/w)) at ratios of 0-11 g resin to g NCC and gently stirred for about one hour. The resin is then removed by filtration. Conductometric titration with aqueous sodium hydroxide is used to quantify the residual $H^+$ counterion content and hence the $Na^+$ counterion content: as shown in FIG. 2, 1 g of resin per g NCC is sufficient to exchange 90% of the $H^+$ counterions, but much larger amounts of resin are needed to approach 100% exchange.

General Procedure C: Redispersing Na-Dispersible NCC in Water

A known quantity of solid freeze-dried Na-form NCC (FD Na-NCC) is dispersed in enough deionized water to give a suspension 1-5% (w/w) NCC in concentration. The sample is vortexed at high speed for 1-5 minutes to ensure complete, homogeneous dispersion. A known volume of the sample (15-25 mL) is then briefly sonicated (200-5000 J/g NCC) to ensure individual NCC particles in suspension.

Example 1

The dispersion of D-NCC in various coatings lead to changes in appearance of said coating once it has dried. The gloss of the coatings can be modified by the addition of D-NCC. Moreover, according to the method of incorporation of the NCC into the coatings, the effect on the gloss will be different. Generally, it is observed that when the concentration in D-NCC increases, the gloss decreases. Modifying the NCC, for example by grafting organic functions, changes the gloss level. Opacity is also measured and results showed that D-NCC hardly affects the opacity of the formulations, in contrast to several matting agents used presently which decrease gloss but also opacity. Table 1 presents the gloss values (at the geometry of 60°) for a water-based acrylic lacquer and a UV-cured water-based varnish (Aquarad 30 sheen from Akzo Nobel) with D-NCC loadings of between about 1% to about 5% by weight. The NCC used in this case is grounded in a ball mill for a period of 48 hours. The powder is then added to a small quantity of the acrylic emulsion and agitated with a strong shear for at least 30 minutes in accordance with Preparation method 1 above. Formulations are then prepared with different loadings of D-NCC from about 1% to about 5% by weight of D-NCC on a dry basis.

TABLE 1

Gloss of water-based acrylic lacquer and UV-cured water-based varnish with different loadings of D-NCC at a geometry of 60°

| % | Acrylic Lacquer | UV-cured water-based varnish |
|---|---|---|
| 0 | 58.7 | 38.9 |
| 1 | 43.1 | 28.4 |
| 2.5 | 33.7 | 23.3 |
| 3.5 | 32.1 | 13.4 |
| 5 | 25.3 | 14.0 |

Example 2

Mechanical properties of the coatings are also modified by the addition of D-NCC. Scratch resistance is among the properties improved by the addition of D-NCC. The addition of D-NCC powder to an acrylic lacquer (162-095 clear Aqua-syl 90° gloss) at concentrations varying between about 1% and about 5% by weight increases the scratch resistance. The gloss lost is used to quantify the effect of the scratch apparatus (related to DIN 53778) and is illustrated in FIG. 1 which shows the gloss lost in function of the percentage of D-NCC, the gloss lost is inversely proportional to the scratch resistance.

Example 3

The addition of a small quantity of D-NCC also improves the abrasion resistance of the coatings. Abrasion resistance is measured by the means of a TABER abraser (Taber Abraser 5135 from Taber Industries). The addition of D-NCC at loadings between about 1% and 5% by weight in a UV-cured water-based varnish (Aquarad 30 sheen, Akzo Nobel) prepared in accordance with Preparation method 1 above leads to an improvement of the scratch resistance. FIG. 2 illustrates the mass lost of the UV-cured water-based varnish with D-NCC loading from about 1% to about 5% by weight in which the mass lost is inversely proportional to the abrasion resistance. These coatings have good abrasion resistance because of the high degree of cross-linking and it is therefore very difficult to improve their mechanical performance.

Example 4

The coatings hardness is also improved by the addition of a low D-NCC loading only such as about 1% to about 5% by weight (see FIG. 1). At low loadings (1% wt), it is possible to significantly improve the hardness of an acrylic lacquer (162-095 clear Aqua-syl 90° gloss), the coating being prepared in accordance with Preparation method 2 above. With the addition of more than about 1% by weight of D-NCC, the hardness decreases. These tests were carried out on standardized steel plates and yellow birch. The hardness test used a Konig pendulum. The higher the oscillating time, the harder is the surface (ASTM D 4366).

Example 5

Figure 4:
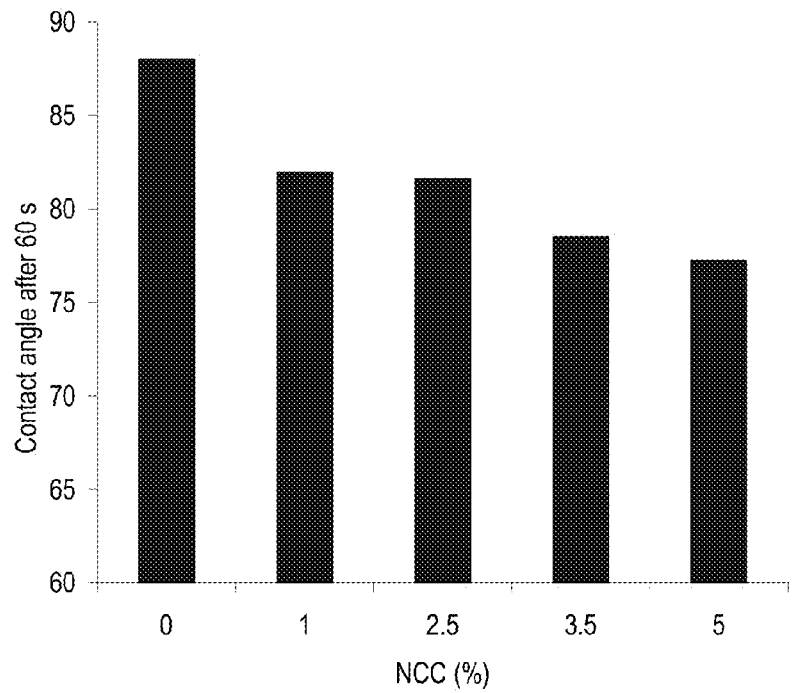
FIG. 4 illustrates contact angles measured on wooden elements for water-based acrylic lacquers with different D-NCC loading.
Figure 5:
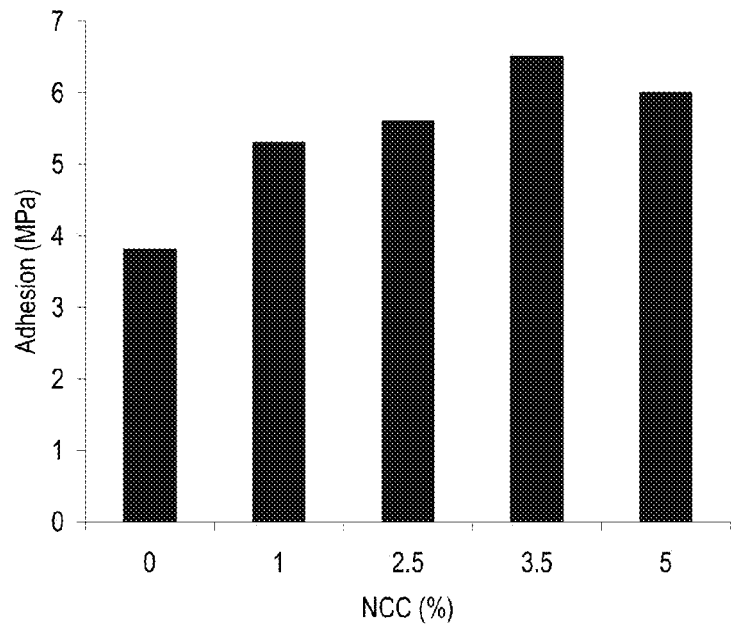
FIG. 5 illustrates the adhesion of UV-cured water-based varnish on wooden elements at various D-NCC loadings.

D-NCC also improves the wetting of water-based coatings on wood substrates. Contact angles measured after 60 seconds are recorded for water-based acrylic lacquers (162-095 clear Aqua-syl 90° gloss) prepared in accordance with Preparation method 2 above. The apparatus used is a FTA 200 from First ten Angstroms with different D-NCC loading (see FIG. 4). Contact angles decrease significantly following the addition of D-NCC. Lower contact angles mean better wetting. Good wetting is sometimes difficult to obtain for water-based coatings as the surface tension of water is high. Good wetting is highly desirable in the coating industry as it is necessary in order to obtain a good coating adhesion to the substrate.

Example 6

The adhesion of coatings to wood is a very important property to have in order to achieve good durability. The adhesion of UV-cured water-based varnish (Aquarad 30 sheen from Akzo Nobel) is increased with the addition of D-NCC. The D-NCC containing coating was prepared in accordance with Preparation method 1. The method used determines the traction force necessary to remove an aluminium dolly glued to the surface of the coating (ASTM D 4541).

Example 7

Figure 6:
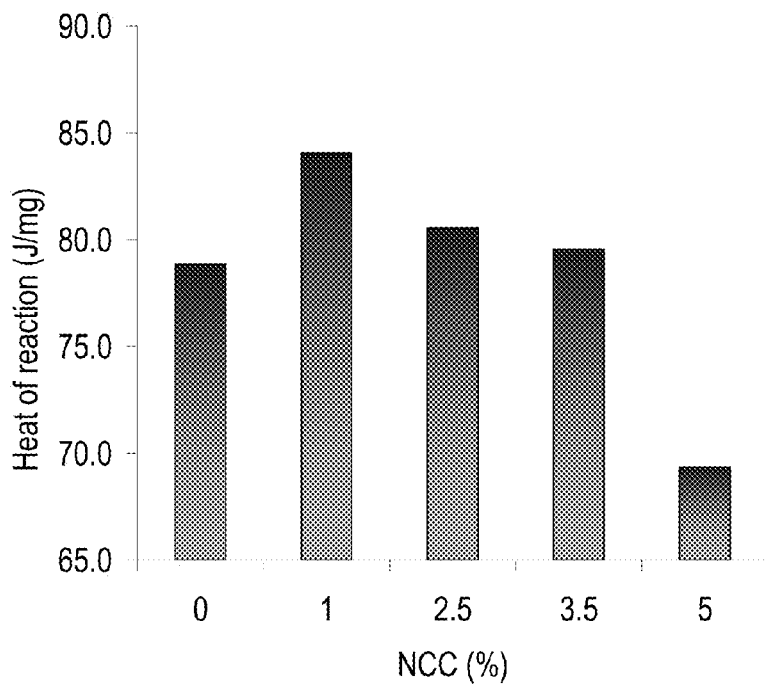
FIG. 6 illustrates the heat of reaction associated to UV-cured water-based varnishes at various D-NCC loadings.

The addition of D-NCC to UV-cured water-based varnishes leads to an increase of the heat of reaction at low loading. The D-NCC containing coating was prepared in accordance with Preparation method 1 and using Aquarad. FIG. 6 shows that a low concentration of D-NCC (about 1% to about 3.5% wt) increases the heat of reaction of the polymerization. Although, when more D-NCC is added, the extent of cure decreases. Photo-calorimetry experiments were performed in order to study the reaction rate. The equipment used is a Photo-DSC (DSC822e from METTLER-Toledo). The UV source used is Lightningcure™ L8333, which is a Mercury-Xenon lamp (240 nm to 400 nm) from Hamamatsu with a maximum absorption at 360 nm.

Example 8

In accordance with Preparation method 4, an hydrophobic coating can be prepared as follows. Dry NCC powder was added to the complete mixture comprised of 30% monomers (1,6 hexanediol diacrylate (HDODA, SR 238) and tripropylene glycol diacrylate (TRPGDA, SR 306), two bifunctional monomers) and 70% of oligomers (an aliphatic polyester-based urethane hexaacrylate oligomer (CN 968) and a difunctional bisphenol A based epoxy acrylate blended with TRPGDA (CN 104A80) and dispersed using a high speed mixer. All acrylate products were provided by Sartomer. The ratio monomer/oligomer can vary from 1:5 to 1:1. The free-radical photoinitiator chosen is 2-hydroxy-2-methyl-1-phenyl-1-propanone (Darocur 1173) from Ciba Specialty Chemicals.

Example 9

Figure 7:
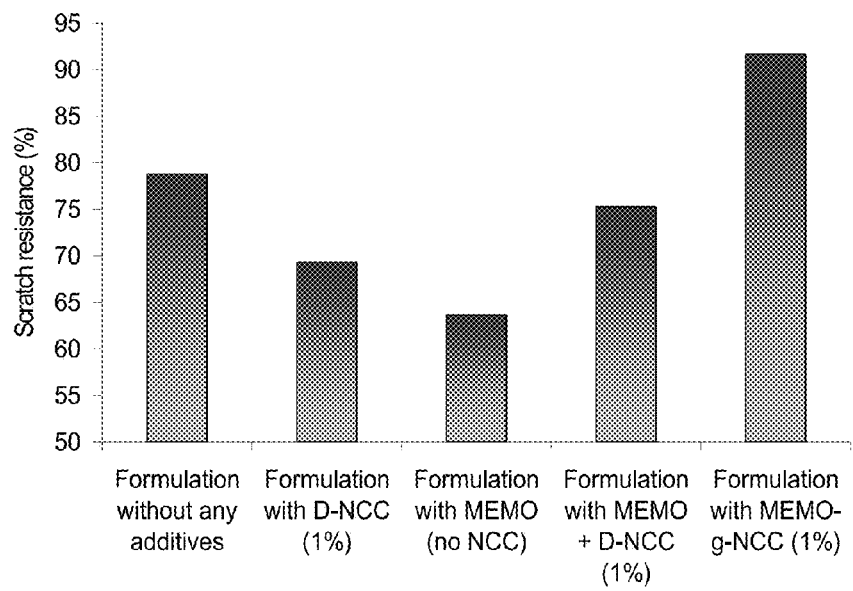
FIG. 7 illustrates scratch resistance of UV-cured high solids with or without various additives.

The scratch resistance of UV-cured high solids coatings (see preparation method 4 and Example 8 above) is improved with the addition of a NCC modified with a silane coupling agent (Dynasylan MEMO from Evonik) as illustrated in FIG. 7. Control formulations are prepared in order to determine if the scratch resistance increase is related to the addition of the silane coupling agent only or the compatibilized NCC. Results show that the only coating formulation that can improve the scratch resistance is the one prepared with the grafted NCC. All the other formulations show less scratch resistance than the one without any additives, which means that the NCC modified by silane grafting can significantly help the mechanical properties of the UV-cured high solids coatings. MEMO-g-NCC represents the D-NCC modified with the coupling agent Dynasylan MEMO and MEMO+D-NCC is the admixture.

Example 10

Figure 8:
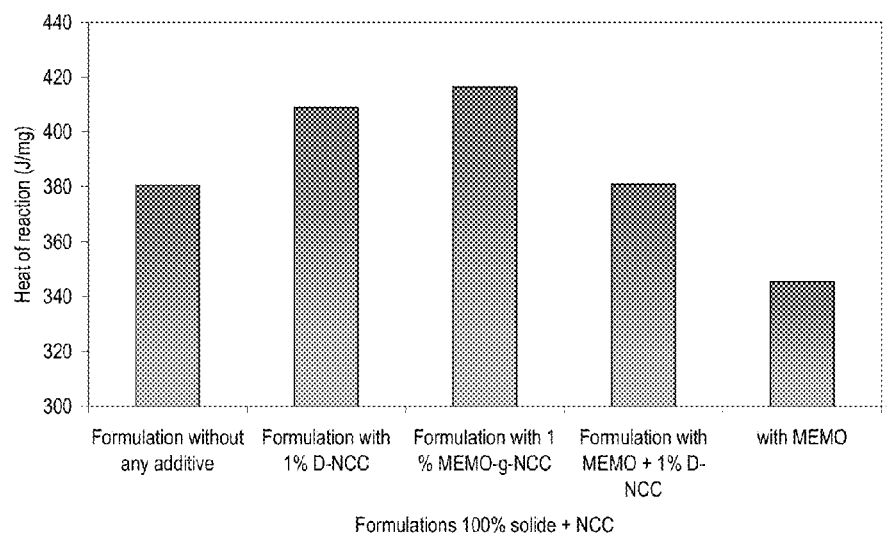
FIG. 8 illustrates the heat of reaction associated to UV-cured high solids varnishes with the addition of 1% 3-methacryloxypropyltrimethoxysilane (MEMO-g-NCC).

The addition of 1% of MEMO-g-NCC to UV-cured high solids varnishes leads to an increase of the heat of reaction. The MEMO-g-NCC containing coating was prepared in accordance with Preparation method 4. FIG. 8 shows that a low concentration of MEMO-g-NCC increases the heat of reaction of the polymerization. Photo-calorimetry experiments were performed in order to study the reaction rate. The equipment used is a Photo-DSC (DSC822e from METTLER-Toledo). The UV source used is Lightningcure™ L8333, which is a Mercury-Xenon lamp (240 nm to 400 nm) from Hamamatsu with a maximum absorption at 360 nm. MEMO-g-NCC represents the D-NCC modified with the coupling agent Dynasylan MEMO and MEMO+D-NCC is the admixture.

The invention claimed is:
1. A composition for coating wooden elements comprising a wood coating and dispersible nanocrystalline cellulose or dispersible nanocrystalline cellulose modified with an organofunctional silane,
    wherein the dispersible nanocrystalline cellulose and the dispersible nanocrystalline cellulose modified with organofunctional silane comprise monovalent cations associated with sulfate ester groups on the dispersible nanocrystalline cellulose,
    further comprising at least one reinforcing agent and/or other additive suitable for wood coatings, selected from the group consisting of fumed silica, crystalline silica, aluminum oxide, calcium carbonate, titanium dioxide and mixtures thereof.

2. The composition according to claim 1, wherein the amount of nanocrystalline cellulose is up to about 5% by weight of the wood coating.

3. The composition according to claim 2, wherein the amount of nanocrystalline cellulose is about 1% or 2% by weight of the wood coating.

4. The composition according to claim 1, wherein the coating is a hydrosoluble water-based coating.

5. The composition according to claim 1, wherein the coating is a hydrodispersible lacquer.

6. The composition according to claim 1, wherein the coating is a hydrophobic UV-cured high solids varnish.

7. The composition according to claim 4, wherein the nanocrystalline cellulose is dispersible nanocrystalline cellulose.

8. The composition according to claim 5, wherein the nanocrystalline cellulose is nanocrystalline cellulose modified with an organofunctional silane.

9. The composition according to claim 5, wherein the organofunctional silane is (meth)acryloxyalkyl-trialkoxysilane.

10. The composition according to claim 1, wherein the monovalent cation is sodium.

\* \* \* \* \*